(12) United States Patent
Archer, Jr. et al.

(10) Patent No.: US 8,978,223 B1
(45) Date of Patent: Mar. 17, 2015

(54) PORTABLE ASSEMBLY OF STACKABLE DRAWERS OF ROTATING CYLINDRICAL ROLLERS

(75) Inventors: Harry L. Archer, Jr., Alexandria, VA (US); Peter A. Margiotta, La Plata, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 818 days.

(21) Appl. No.: 13/317,536

(22) Filed: Oct. 20, 2011

(51) Int. Cl.
*B25B 27/14* (2006.01)

(52) U.S. Cl.
USPC .................................. 29/281; 29/270; 29/280

(58) Field of Classification Search
USPC ........................................... 29/270, 280, 281
See application file for complete search history.

(56) References Cited

U.S. PATENT DOCUMENTS

| | | | |
|---|---|---|---|
| 839,236 A * | 12/1906 | Vartanian | 99/421 HV |
| 4,982,657 A | 1/1991 | Ghenic | |
| 5,421,246 A * | 6/1995 | Tippmann et al. | 99/448 |
| 6,354,193 B1 | 3/2002 | Lee | |
| 6,800,314 B2 | 10/2004 | Evans | |
| 2004/0211325 A1* | 10/2004 | Poland | 99/441 |
| 2005/0061161 A1* | 3/2005 | Hunot et al. | 99/441 |

OTHER PUBLICATIONS http://www.coleparmer.com/catalog/vcatalog_page.asp?p=1135.
Technical Program Review, 1956, Chapter 6, Propellants and Propulsion for Missiles, (two cover pp. and pp. 163-168).

* cited by examiner

*Primary Examiner* — Lee D Wilson
*Assistant Examiner* — Shantese McDonald
(74) *Attorney, Agent, or Firm* — Fredric J. Zimmerman

(57) ABSTRACT

An apparatus for curing cylindrical shaped elements having a liner, especially a liner of a rocket motor sleeve, where the cylindrical shaped elements are cured during rotation in a horizontal orientation. Horizontal rotation produces a liner with a substantially uniform thickness. The apparatus is mobile, compact, and has built-in robust safety mechanisms not compromised by the heat used to effect a cure. The cylindrical rollers are easily cleaned with minimal cross-contamination of one lot to another. Dripping of elastomeric materials from one assembly of rollers onto a stackable assembly of rollers below is eliminated. Each stackable assembly of rollers is independently controlled where each assembly is driven by its own motor, so rotation of one assemble does not affect another assembly of rollers.

18 Claims, 12 Drawing Sheets

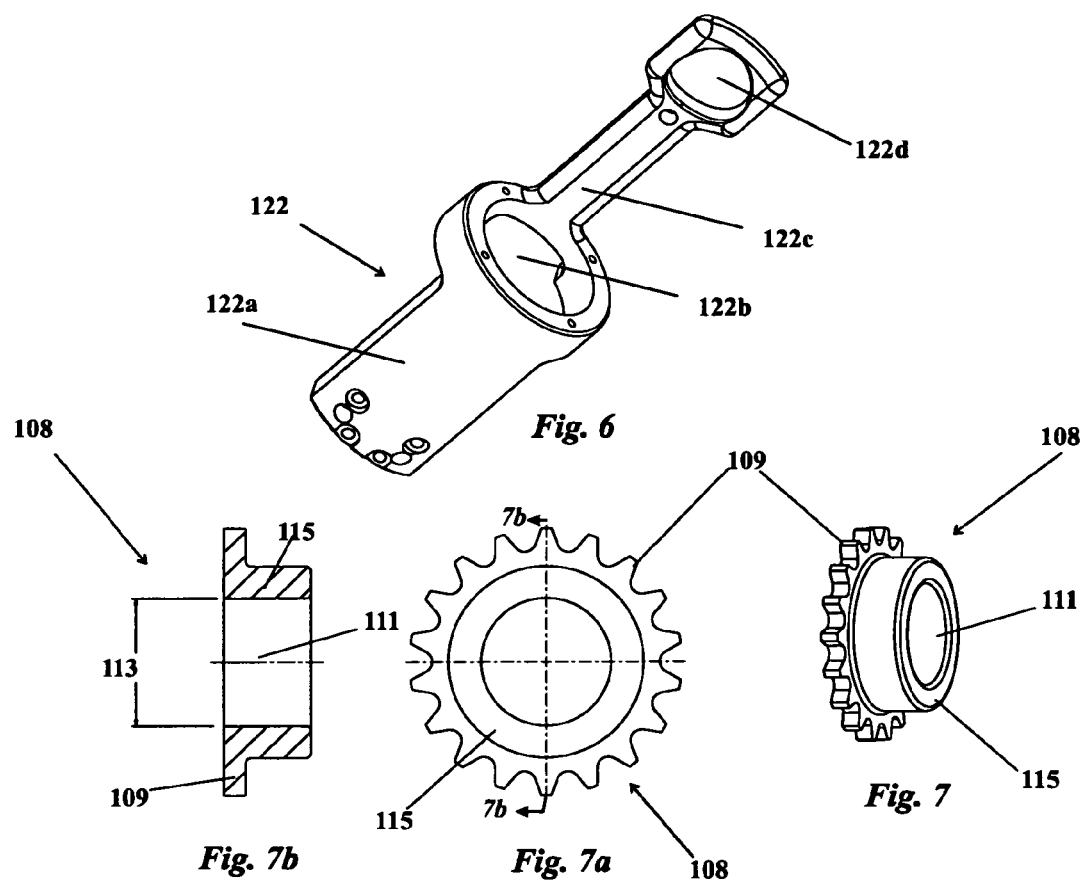

US 8,978,223 B1

PORTABLE ASSEMBLY OF STACKABLE DRAWERS OF ROTATING CYLINDRICAL ROLLERS

STATEMENT OF GOVERNMENT INTEREST

The invention described herein may be manufactured and used by or for the Government of the United States of America for Governmental purposes without the payment of any royalties thereon or therefore.

BACKGROUND OF THE INVENTION

1. Field of the Invention

The present invention relates generally to a roller assembly, and in particular to an apparatus that is a portable assembly of stackable drawers of cylindrical rollers, where the apparatus is suitable for rotating, for example, a liner of a rocket motor sleeve and other cylindrical shaped elements during curing.

2. Description of the Prior Art

The background teaches that assemblies of rotating cylindrical rollers can be used to uniformly heat hot dogs. U.S. Pat. No. 6,800,314 to Evans et al. teaches an offset multi-tier rotary grill for grilling and heating food items such as hot dogs, sausages, melts and similar food items. The rotary grill includes heated rollers that are arranged in vertically spaced apart roller tiers. The prior teaches that assemblies of rollers are fixed, and offset multiple tiers. In cooking, the food is typically visible at all times, presumably to entice a customer visually.

SUMMARY OF THE INVENTION

The invention is an apparatus for curing cylindrical shaped elements having a liner, especially a rocket motor sleeve with a liner of a rocket motor sleeve, where the cylindrical shaped elements are cured as they are rotated in a horizontal orientation. Horizontal rotation during curing generally produces a sleeve having a liner with a more uniform thickness.

An aspect of the invention is that the apparatus can accommodate a production lot of motor tubes. Another aspect of the invention is that the apparatus is mobile, compact, and has built in robust safety mechanisms that are not compromised by the heat used to effect a cure.

Another aspect of the apparatus is that the cylindrical rollers used to rotate a production lot of motor tubes are easily cleaned, and that there is minimal cross-contamination of one lot to another lot of materials generated during a cure cycle. For instance, cross-contamination caused by the dripping of elastomeric materials from one assembly of cylindrical rollers on a stackable assembly of cylindrical rollers below an upper assembly, which, may be loaded with a production lot of motor tubes, is substantially eliminated.

A further differentiating aspect of the invention is that each stackable assembly of cylindrical rollers is independently controlled, that is each assembly is driven by its own motor, so that rotation of one assemble does not affect another assembly of cylindrical rollers. Independent control has the benefit that production lots can be started and stopped independently. If there is a failure by one assembly, it generally will not affect adjacent assemblies.

An advantage of the disclosed anti-tip safety mechanism, beyond the advantage that tip-over is eliminated, is that the mechanism may be tested by simply pulling out a drawer containing an assembly of cylindrical rollers. If the mechanism is working properly, there will be some resistance tension on the drawer to pull the drawer back to the closed, stacked position. The tension also does not increase as the drawer is pulled out further. However, the tension will dramatically increase when the anti-tip safety mechanism reaches the stop position. This dramatic increase in tension is accompanied by preventing more than one drawer from being capable of being pulled out.

The naming convention employed in this disclosure utilizes the accepted notation that articles "a" and "an" can denote one or more, and are not limited to a single number.

BRIEF DESCRIPTION OF THE DRAWINGS

The foregoing invention will become readily apparent by referring to the following detailed description and the appended drawings in which:

FIG. 6 is an enlarged partial view of the guard support shown in FIG. 1, where the guard support, which is mounted to the right handle mount, supports the gear motor and the CPP Plug, wherein the illustrated guard support is a single piece, having a guard base section for mounting the guard support to the handle mount 144, a substantially cylindrical section for mounting the gear motor, a substantially linear section for supporting a chord for the CPP plug, and a substantially rectilinear section with a circular opening for mounting the CPP plug;

FIG. 7 is a perspective view of a cylindrical roller sprocket, where the sprocket has teeth on a hub with a bore, where the bore has an inside diameter that will accommodate a bolt;

FIG. 7*a* is a planar view of the cylindrical roller sprocket illustrated in FIG. 7;

FIG. 7*b* is a cross-sectional view of the cylindrical roller sprocket illustrated in FIG. 7*a*, taken along sectional line 7*b*-7*b*;

FIG. 9*a* is an end-on left side view of a drawer;

FIG. 9*b* is an end-on right side view of a drawer;

DETAILED DESCRIPTION OF THE INVENTION

Figure 1:
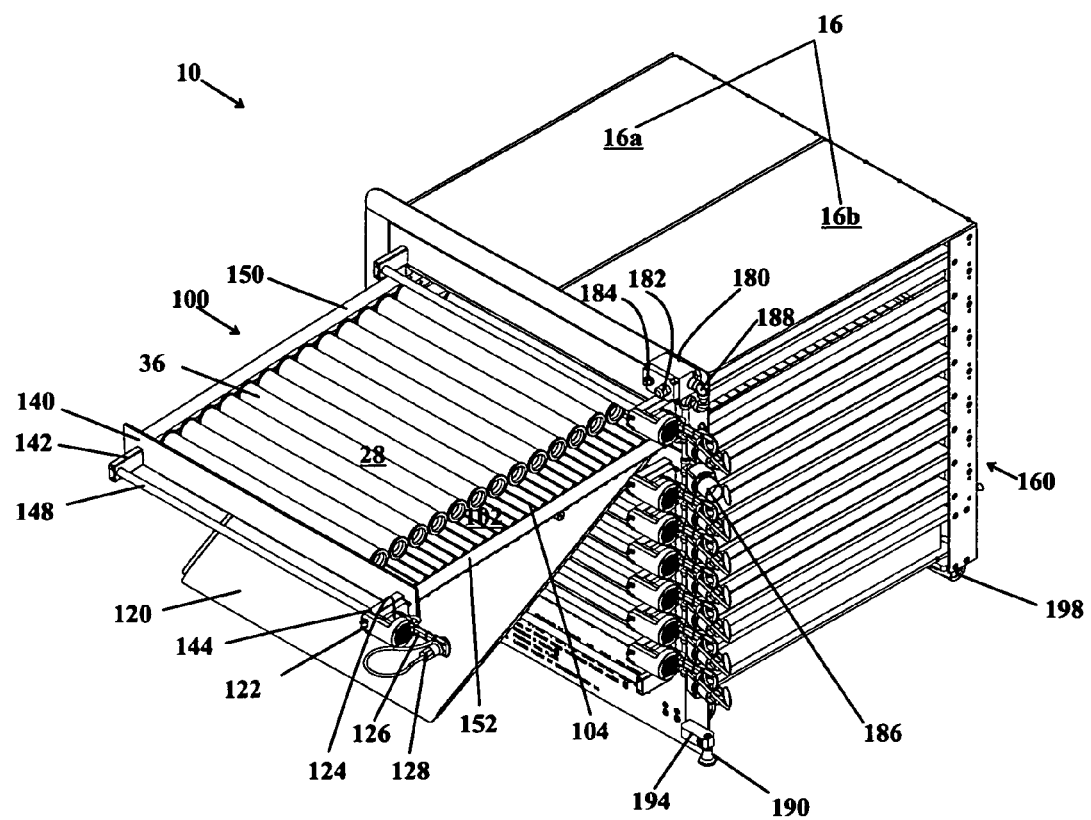
FIG. 1 is a perspective view of an embodiment of the apparatus illustrating a vertical rack carrying multiple stackable drawers, where each drawer has an assembly of driven cylindrical rollers.
Figure 8:
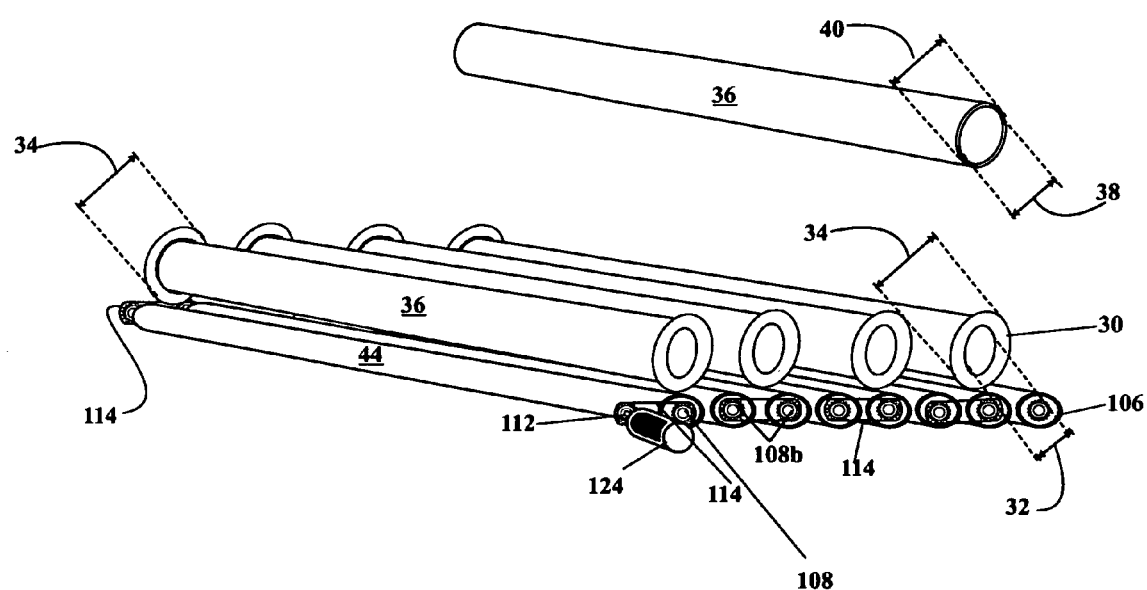
FIG. 8 is a diagrammatic view of an assembly of driven cylindrical rollers which are rotating a partial production number of rocket motor tubes/sleeves fitted with flanged ring shaped masks.

The invention is an apparatus that is an assembly of cylindrical rollers, where, in one exemplary embodiment, the assemble is in a frame, where the frame constitutes stackable drawers of cylindrical rollers that are individually driven. The apparatus is suitable for rotating and may be used for curing a liner of a rocket motor sleeve and other cylindrical shaped elements during curing. Generally, rocket motor sleeves are substantially case bonded grain sleeves that are grit blasted, and lined with a curing fire retardant liner. In one case, the liner has an oligomeric material, such as hydroxypolybutadiene, (sometimes referred to as R45-HT and was made by ARCO) or carboxypolybutadiene that is cured into a polymeric material. The curing process is augmented through the application of heat, where the temperature is generally on the order of 150° F.-200° F., and more particularly about 165° F. As shown in FIGS. 1 and 8, the ends of the sleeves are fitted with flanged ring shaped masks forming a doughnut-shaped surface, which serves to exclude the liner from the ends of the cylindrical shaped element and elevate the sleeves so that the sleeves need not actually come into contact with cylindrical rollers 102. Therefore, the diameter of the masks generally define the design diameter such that adjacent masks do not contact each other upon rotation. A gear motor 124 with a powered sprocket 112 drives a chain 114, which is connected to a sprocket 108 (shown as either 108*b* motor/right or 108*a* opposing/left) on a cylindrical roller 44. In the illustrated embodiment each cylindrical roller 44 has a pair of sprockets, where a sprocket on one end is connected to the cylindrical roller on the right, and on the other end the sprocket is connected to the cylindrical roller on the left. As shown, the second cylindrical roller is connected to the third cylindrical roller, and on the other end the second cylindrical roller is connected to the first cylindrical roller. The first cylindrical roller is driven by the motor 124. The net effect of this sequential assembly is that all cylindrical rollers turn in the same direction, there are no long lengths of chain, and the cylindrical rollers rotate at substantially the same speed as established by the gear motor with the gear sprocket.

This arrangement may alternately be described as having a first sprocket on one end and a second sprocket on an opposing end, where the first sprocket on the first cylindrical roller is connected with a first chain to the driven sprocket on the gear motor. The second sprocket on the first cylindrical roller is successively connected through a second chain to a second sprocket on a next roller, such that the next roller is driven by the first cylindrical roller. Subsequently, therein making the next cylindrical roller a second driven cylindrical roller, which has a first sprocket that successively drives a following cylindrical roller, where the pattern repeats until all cylindrical rollers are driven and all rotate in the same direction. The chain length is limited to two sprockets, therefore the profile (height) of a drawer may be kept low as there is minimal chain sag, no intervening gears are necessary, little contamination, fewer parts, less weight and the assembly is capable of being easily reconfigured to handle larger diameter motor sleeves.

As shown in other drawings, each drawer of assembly of cylindrical rollers has its own individual gear motor. This configuration enables individual drawers to be processed at different rotational speeds.

In the illustrated exemplary embodiment, the cylindrical rollers are substantially parallel and separated by a distance that is sufficiently wide to ensure that the masks 30, which have a known OD diameter 34 on one sleeve 36, do not contact the masks on an adjacent sleeve. The masks may be selected so they fit the sleeve ID 38 and OD 40. The ID 38 of the mask may be a consideration as it may influence air through the sleeve 36 during curing. The distance separating the cylindrical rollers must be sufficiently close to retain the sleeves when rotated. The cylindrical rollers 44, 102 are generally covered by a protective coating 106 (Heat shrink PTFE tubing), and this feature needs to be considered in determining the distance that the cylindrical rollers are separated.

As will become further evident, the invented apparatus is compact, having high product density; there are numerous aspects that reduce cross contamination; and a safety cable system prevents tip over by allowing only one drawer to be opened fully at a time.

A perspective view of an embodiment of the apparatus 10 is illustrated in FIG. 1, which includes a vertical rack 162 on a cart 160 carrying multiple stackable drawers 100, where each drawer has an assembly of driven cylindrical rollers 102. In the illustrated embodiment there are eight stackable drawers. The drawers are loaded in the vertical rack stack in a manner similar to drawers in a chest-of-drawers. As seen in the open drawer 100, the assembly of driven cylindridal rollers 102 may, in an exemplary embodiment, include twenty six driven individual cylindrical rollers 104 in the drawer 100. A pair of adjacent cylindrical rollers rotate one cylindrical sleeve 36, and therefore, the assembly of cylindrical rollers 102 in one drawer may, in an exemplary embodiment, turn thirteen rocket motor sleeves 28. Assuming, in an exemplary embodiment, all eight drawers have thirteen cylindrical sleeves 36, the apparatus may have the capacity to rotate and cure one hundred and four solid rocket motor sleeves 36 or a comparable number of similar sized cylindrical elements.

The illustrated open drawer 100 has a catch tray 120 to contain any generated material (such as curing polymer) to a single drawer; and a face plate 140 with a left handle mount 142, a right handle mount 144, and a handle 148. On an outside surface of the face plate 140 is mounted a guard support 122 to which is attached an explosion proof CPP plug 128, and a gear motor 124 with a motor sprocket (not visible), where the gear motor 124 has a gear motor screen 126.

The guard support 122 is shown in FIG. 1 and in detail in FIG. 6. The guard support 122 is mounted to the right handle mount 144 which is mounted to the face plate 140. The guard support 122 supports the gear motor 124 and the CPP Plug (explosion proof) 128. The illustrated guard support 122 is a single piece, having a guard base section 122a for mounting the guard support 122 to the handle mount 144. The guard support 122 further includes a substantially cylindrical section for mounting 122b the gear motor 124, a substantially linear section 122c for an electrical chord for the CPP plug 128, and substantially rectilinear section with a circular opening 122d for storing the CPP plug 128.

As shown when the second drawer is opened the CPP plug 128 has been turned to the unlock position and unplugged from the corresponding receptacle 186 mounted on the vertical rack. When the drawer is closed the CPP plug 128 is handy, and it can be plugged back into the receptacle. An explosion proof switch box 180 with a switch 182 and a pilot light 184 is mounted proximate to the receptacle 186, connected by conduit 188. When all drawers are closed, the face plates cumulatively form a thermal barrier, isolating the gear motors 124 from exposure to heat. The face plates function as a door to retain heat and move air. The top cover 16 (shown in FIG. 1) includes panels 16a and 16b, which also function to protect the contents within the apparatus and to provide some degree of insulation.

Figure 9:
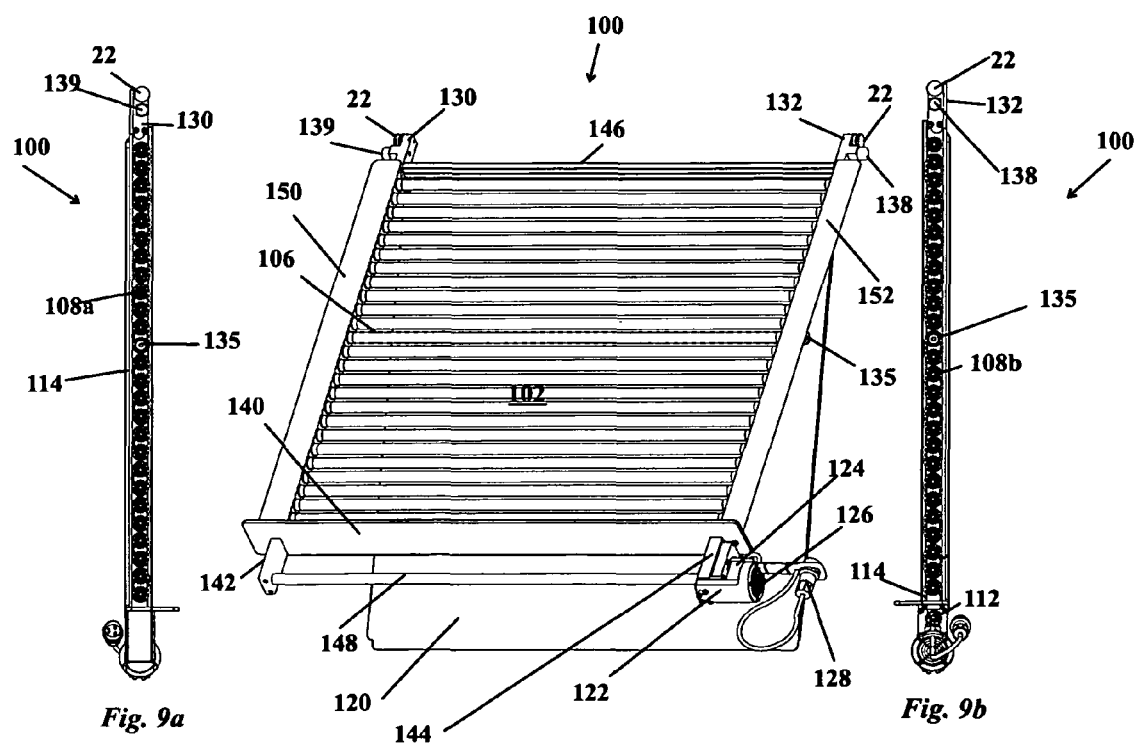
FIG. 9 is a substantially frontal view of a tilted drawer, wherein the drawer is tilted so as to make the track cylindrical rollers and V-groove cable rollers mounted on the drawer extensions more easily seen.

Each drawer 100 has a left angle element 150 and a right angle element 152. The left and right angle elements 150, 152 are oriented such that they cover the sprockets and chains, as well as support the drawer. The back of the drawer has a drawer cross bar 146 (not visible in FIG. 1, see FIG. 9). As illustrated in FIG. 9, the drawer cross bar 146 is supported by a left extension 130 on the opposing side projecting from the left angle element 150, and a right extension 132 projecting from the right angle element 152 on the motor side. The right extension 132 has a V-grooved retaining roller 22 and a stud mounting track wheel 138 that is corrosion resistant. Likewise, the left extension 130 has a V-grooved track retaining roller 22 and another stud mounting track wheel 139 that is corrosion resistant. As may become apparent in forthcoming drawings, the V-grooved retaining rollers 22 intersect a constraint cable assembly 205 that is a component of an anti-tip mechanism 200. Other elements of the drawer are best viewed in FIGS. 9a and 9b, which are end-on side views. Substantially, each individual cylindrical roller 104 has two sprockets, a motor side sprocket 108b and an opposing side sprocket 108a. The sprockets on each side are connected in pairs with a chain 114, such that all cylindrical rollers are driven by a motor sprocket 112 (shown in ghost with dashed lines) and all cylindrical rollers 102 rotate in the same direction. The illustrated chain has a connecting link and is typically composed of a polymeric material, such as acetal. The composition of the chain is not a limitation.

In an exemplary embodiment, a sprocket is shown in FIGS. 7, 7a and 7b. As previously stated substantially each cylindrical roller 104 has two sprockets 108, which are substantially identical, differing only in their location. A sprocket on the motor-side or right is numbered 108b, and those sprockets on the opposing or left side are numbered 108a. FIG. 7 is a perspective view of an exemplary sprocket 108. The sprocket 108 includes teeth 109 on a hub 115 with a bore 111. The bore 111 includes an inside diameter 113. The sprocket is generally mated with an end of a cylindrical roller 104 with a bolt. Generally, the sprocket 108 does not also serve as a bearing for the cylindrical roller, but it is anticipated that this configuration may be possible.

Referring again to FIGS. 1 and 9, each of the cylindrical rollers 104 of the cylindrical roller 102 is covered with heat shrink PTFE tubing 106 (one tube is shown as a pair of dashed lines). The tubing is transparent-trimmed to cover the cylindrical roller 104. PTFE is a synthetic fluoropolymer of polytetrafluoroethylene. The PTFE protects the cylindrical rollers, and makes them easy to clean and cleaning is less frequent as PTFE is a low stick material. Additional low stick material are anticipated.

Figure 2:
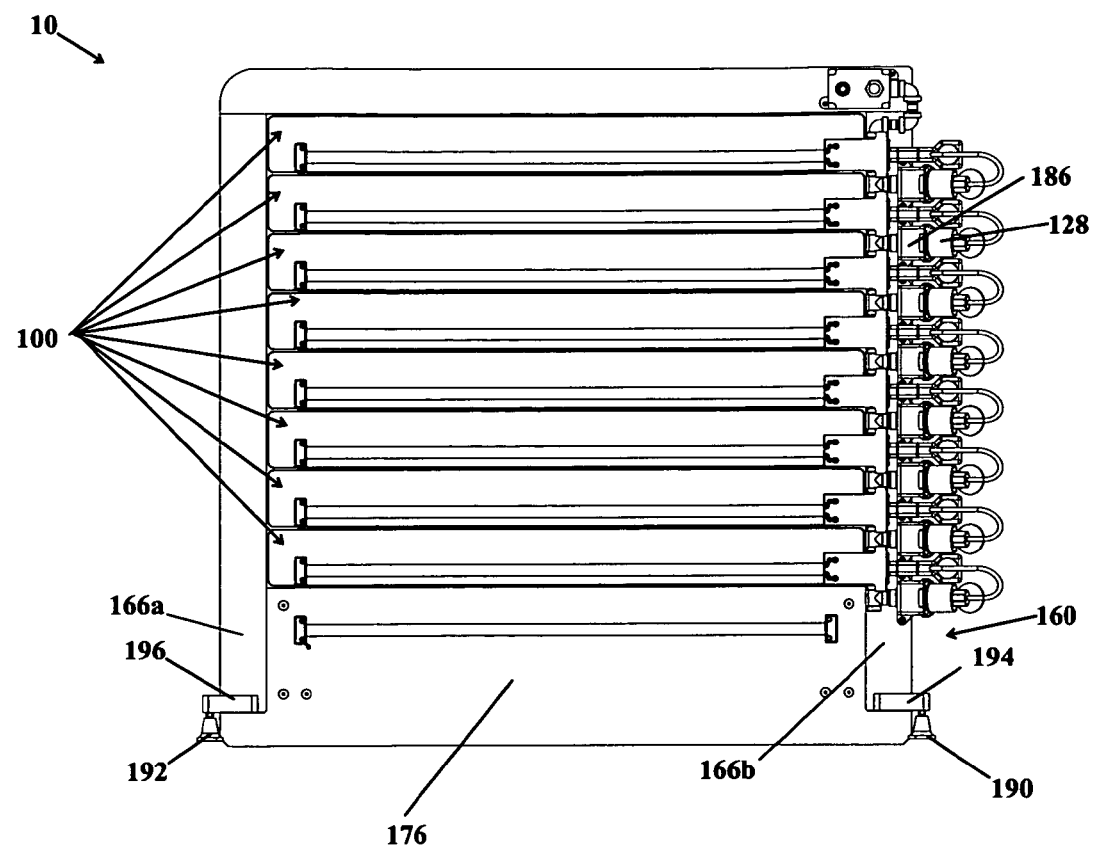
FIG. 2 is a frontal view of the apparatus illustrating a pair of miniature screw jacks, where all eight drawers are closed and all CPC plugs are plugged into their respective receptacles.

The front of the apparatus 10, as shown in detail in FIG. 2, has a of pair miniature screw jacks 190,192 with a fixed saddle (generally 3 ton capacity, 4" max height). The screw jacks enable the cart to be elevated and substantially locked into position. Miniature screw jack $_{(Right)}$ 190 extends from a lift plate $_{(Right)}$ 194 (front motor side), and miniature screw jack $_{(Left)}$ 192 extends from a lift plate $_{(Left)}$ 196 (front opposing side) that is respectively attached to a right front angle 166b and a left front angle 166a (best seen in FIG. 3). The base 12 is largely hidden by the front skirt plate 176. Note, that in FIG. 2 all drawers 100, and in an exemplary embodiment eight drawers, are closed, and all CPC plugs 128 are plugged into their respective receptacles 186.

Figure 3:
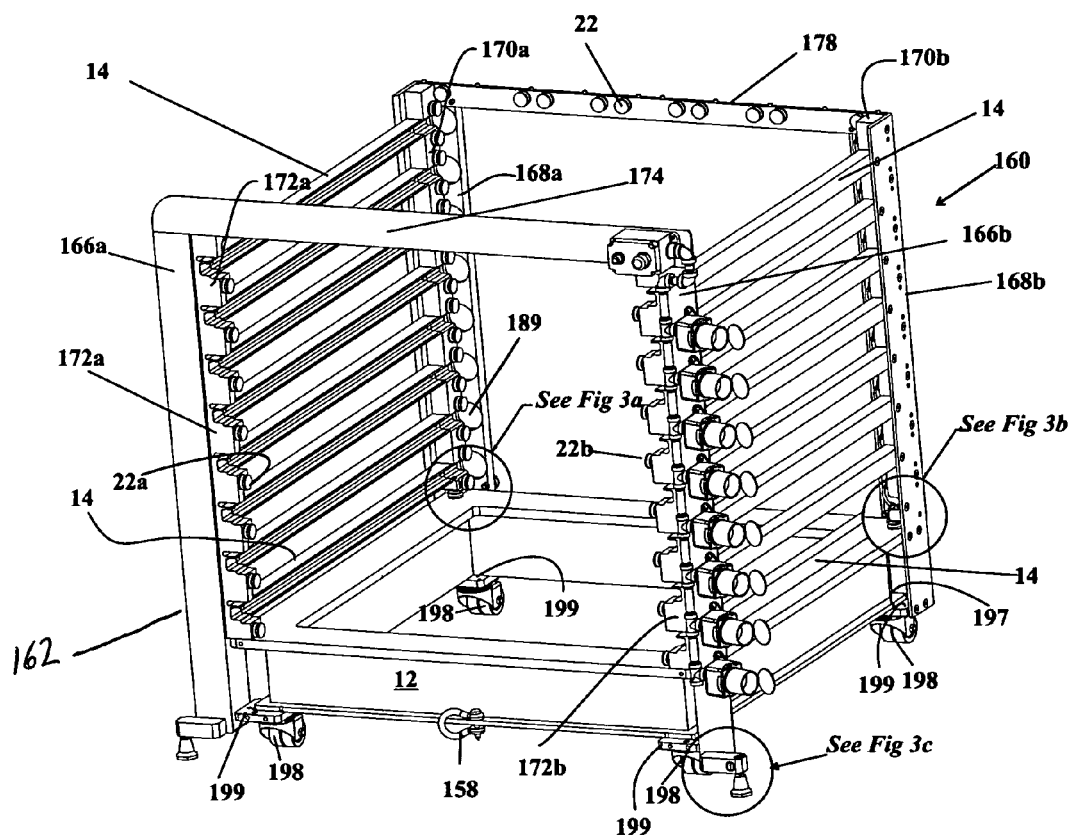
FIG. 3 is a perspective view of an embodiment of the apparatus with all the drawers removed exposing the components of the cart, which include a vertical rack mounted on the base with an anchor shackle, where the base is substantially a rectangular I-beam assemblage and the rack provides support and movement for the drawers, the vertical components of the rack have portals to channel air flow across the cylindrical rollers and the sleeves/tubes rotating on the cylindrical rollers.

As shown partially in FIG. 1, and in greater detail in FIG. 3, the cart 160 has a mechanism to facilitate movement. The exemplary embodiment includes four swivel casters 198 attached to a base-plate 199, where the casters have a hard rubber tread such as, Nylon, or polyurethane or another tough elastomeric material that is non-abrasive. The caster 198 may also have a stop 197 that sets the direction and freedom of the caster to move. It is anticipated that in some exemplary embodiments casters may not be used. For instance, the apparatus may be loaded on a heavy duty pallet and moved with a fork lift, or the apparatus may be on a rail carrier.

In FIG. 3, all the drawers are removed exposing the components of the cart 160, which includes a vertical rack 162 mounted on the base 12 with an anchor shackle 158. The shackle is used to tow the apparatus, and is generally covered by front plate skirt 176 (shown in FIG. 2).

The base is substantially a rectangular I-beam assemblage. The rack 162 provides support and movement for the drawers and the vertical components of the rack have portals 189 to accommodate drawer extensions 130,132 (see FIG. 9). Air can flow can easily move side-to-side across the cylindrical rollers 102 and the sleeves 28 rotating on the cylindrical rollers (previously identified in FIG. 1). The vertical rack 162 is largely built on the base 12, which support a rack of tracks 14 based on a C-channel or C-shaped channel. In an exemplary embodiment, there are eight C-channel tracks on the left and eight C-channel tracks on the right. The top and bottom tracks are numbered. The rack includes a left front angle 166a, a right front angle 166b, a left rear angle 168a, a right rear angle 168b, a rack cross bar 178, a left rear support 170a, a right rear support 170b, a top front angle 174, a left front support 172a, a right front support 172b, multiple V-grooved track rollers 22a, 22b, and front plate skirt 176 (shown in FIG. 2). The left rear support 170a and the right rear support 170b and formed so as to be contiguous with the channel, therein forming portions of the rack of tracks.

Figure 5:
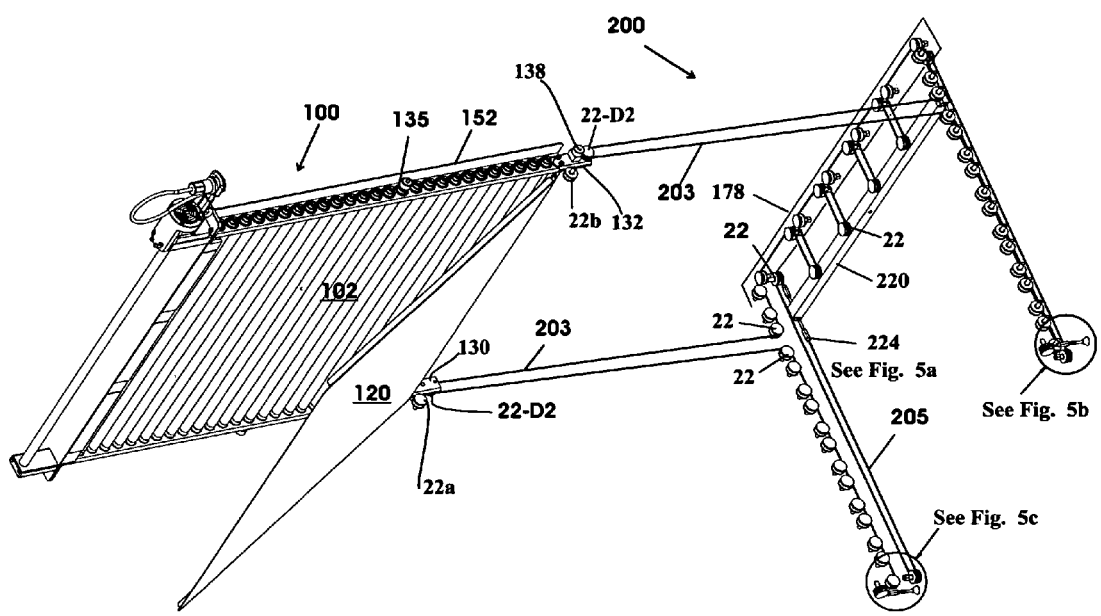
FIG. 5 illustrates how the schematic shown in FIG. 4 can be incorporated in the apparatus, where in FIG. 5 the drawer actually is able to move a distance that approaches or is greater than the height of the apparatus, the track rollers at the front of a track indicating the extent of possible movement, where to lengthen horizontal movement of the drawer and shorten movement of the weight, the drawer cable is looped multiple times around V-groove rollers from the cross bar to the weight resulting in a pulley-like system that creates a mechanical advantage.

The V-grooved track rollers 22a, 22b are permanently lubricated, and function as bearings for a drawer 100, providing support for an lower edge of drawer angle elements 150, 152 (shown in FIGS. 5 and 9). The track wheels 138,139 (see FIG. 9) on the drawer extensions 130,132 move through the C-channel track 14, through the support portions and in the illustrated variation through portals 189 (more of this later FIG. 10, 189-right and 189-left). The same V-grooved rollers 22 also function as guide pulleys 22 for the cable in the anti-tip mechanism 200. The adaptation of the same element, such as V-grooved rollers 22, to perform multiple tasks demonstrates consideration and inventiveness that makes the apparatus more commercially viable and a conservation of inventoried items.

Figure 3A:
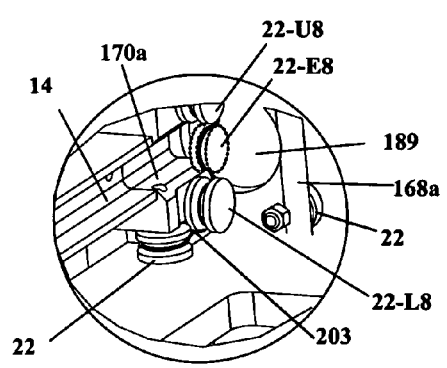
FIG. 3a is an enlarged partial view of the rack shown in FIG. 3, that illustrates components of the anti-tip safety mechanism and the track for the bottom drawer, where the track is a C-channel shape, which abuts the left rear support, to provide support for the tray rollers 135, 138 and 139. Air flows over channel 14 thru the motor tubes on the cylindrical rollers to cure the sleeves while the sleeves are being rotated by the assembly of cylindrical rollers. Air may also flow between angles 168a, 168b, support base 12 and covers 16a and 16b shown in FIG. 10 and FIG. 1.

Referring to FIG. 3a, which is an enlarged partial view of the rack shown in FIG. 3. There is no drawer, and the cable in the anti-tip safety mechanism 200 has not been strung. The view is of the track for the bottom drawer. The track is C-channel 14, which abuts the left rear support 170a. The left rear support 170a is mounted on the left rear angle 168a. The left rear angle 168a has a portal 189 for each track, which provides an opening to accommodate drawer extensions 130, 132. A drawer constraint cable 203 has been added to the drawing to illustrate its path around the V-grooved roller 22 on drawer extensions 130,132, as illustrated in FIG. 9. Access to the track from the back of the vertical rack, in this embodiment, the eighth track, is marked by an upper V-grooved roller 22-U8 and a lower V-grooved roller 22-L8 mounted on the left rear support 170a. The extension V-grooved roller shown in ghost is labeled 22-E8, to differentiate its closed drawer position between the upper V-grooved roller 22-U8 and a lower V-grooved roller 22-L8. When the drawer is opened, the cable is extended and the V-grooved roller 22-E8 moves to a new position.

Figure 3B:
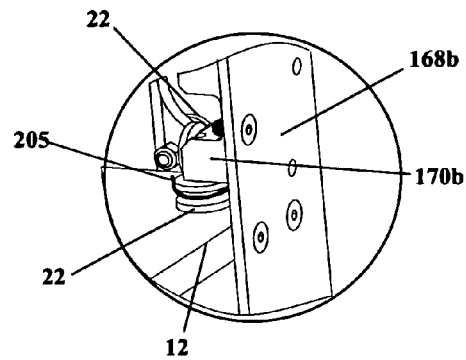
FIG. 3b is an enlarged partial view of the rack shown in FIG. 3, that illustrates a weight constraint cable path around the V-grooved roller 22 attached to the base.

Referring to FIG. 3b, a weight constraint cable 205 has been added to the drawing to illustrate its path around the V-grooved roller 22 attached to the base 12. The drawing furthermore illustrates the relative close proximity of the weight constraint cable 205 to the right rear angle 168b and the right rear support 170b.

Figure 3C:
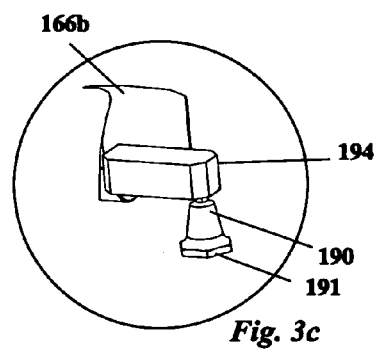
FIG. 3c is an enlarged partial view of the rack shown in FIG. 3, that illustrates how the miniature screw jack enables the cart to be elevated and substantially locked into position, where the base of the jack is hexagonal, and therefore easily turned with a wrench.

Referring to FIG. 3c, the miniature screw jack 190 enables the cart to be elevated and substantially locked into position. The base 191 of the jack may be, in an exemplary embodiment, an hexagonal shaped jack, and therefore easily turned with a wrench. Miniature screw jack $_{(Right)}$ 190 extends from the lift plate 194 (front motor side). Lift plate 194 is fasten to the bottom front of the right front angle 166b. A similar arrangement is on the left side with right front angle 166a (see FIG. 2).

Figure 4:
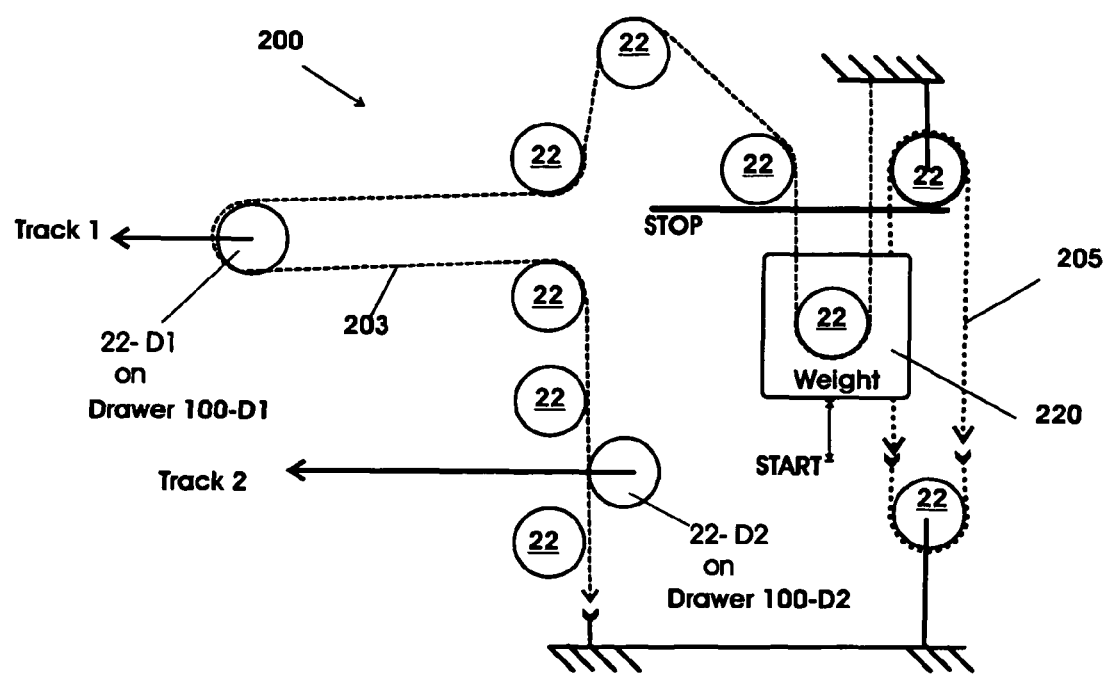
FIG. 4 is a schematic illustration of the anti-tip safety mechanism, where the safety mechanism insures that only one drawer is open at a time, therein insuring that the apparatus does not become unbalanced, and tip over.

FIG. 4 is a schematic illustration of the anti-tip safety mechanism 200. The safety mechanism insures that only one drawer is open at any time, therein insuring that the apparatus does not become unbalanced, and tip over. The safety mechanism has a counter weight 220 that is guided by a weight constraint cable assembly 205 (indicated by the dotted line). In the schematic illustration the apparatus has two drawers 100, an upper drawer 100-D1 which moves on the top track, track 1; and a lower drawer 100-D2 which moves on the lower track, track 2. As previous discussed and shown in FIGS. 9,9a,9b, each drawer has extensions 130,132 fitted with V-grooved rollers 22. In FIG. 4, these V-grooved rollers are labeled 22-D1 and 22-D2 to differentiate them as to drawer #1 or drawer #2. The drawers engage a drawer constraint cable assembly 205 (indicated by the dashed line), and the counter weight 220 through the cable assembly 205 generates tension on V-grooved rollers 22-D1 and 22-D2, as the force of the counter weight is conveyed over the auxiliary V-grooved rollers 22, which act as pulleys or simply a guide to guide the cable 203. In the schematic illustration, the Drawer 100-D1 is pulled open. Pulling the drawer open raises the counter weight from an unsupported start position by a length that cable 203 is extended when the drawer is opened. The drawer may be raised until it raises the weight to where it stops. Tension on the cable 203 prevents the second drawer from being opened, as the weight can no longer move up. The weight is guided up and down by the weight constraint cable assembly 205.

FIG. 5 illustrates how the schematic shown in FIG. 4 may be incorporated in the apparatus. Note that, in FIG. 5, the drawer actually needs to move open a distance that approaches or is greater than the height of the apparatus. The rollers 22a,22b at the front of a track 14 indicate the extent of possible movement. To lengthen horizontal movement of the drawer and shorten movement of the weight 220, the drawer cable is looped multiple times around V-groove rollers from the rack cross bar 178 to the weight 220. This configuration reduces the distance that the counter weight has to move with the resulting pulley-like system creating a mechanical advantage. In the current exemplary embodiment, the mechanical advantage is two fold. First, the length the drawer may move is twice as long as the distance the weight may move before encountering the stop. A second advantage is that the weight of the counter weight may be increased, thereby increasing the force needed to produce tip, which makes the system more safe. Once the counter weight 220 reaches the stop, another drawer cannot be opened without closing the open drawer. In an exemplary embodiment, the cable 203 or 205? may be a stainless steel 9×7 rope having 1500# break strength.

Figure 5A:
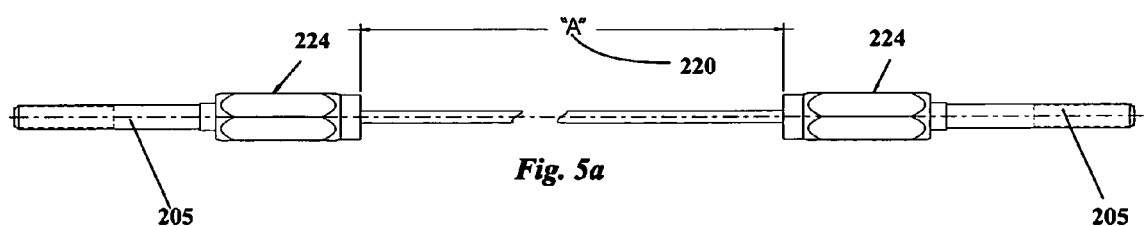
FIG. 5a is an enlarged partial view illustrating how the counter weight 220 is positioned on the cable, with a wire rope grip fitting 224, which locks the weight at a specific position on the cable and joins ends of the weight constraint cable.

Referring to FIG. 5a, the counter weight 220 is positioned on the cable, with a wire rope grip fitting 224, which locks the weight at a specific position on the cable and joins ends of the weight constraint cable (assembly) 205. The wire rope grip fittings 224 also are used to tension the weight constraint cable 205. The wire rope grip fittings 224 are separated by "A", the width of the counter weight 220.

Figure 5B:
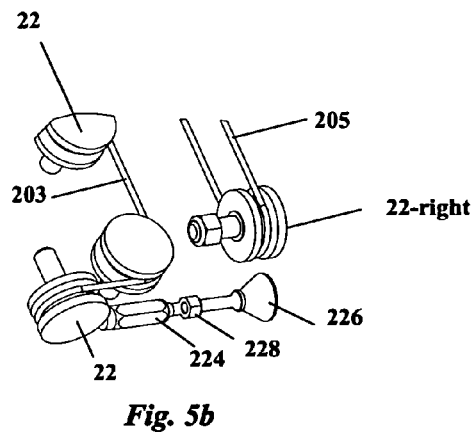
FIG. 5*b* and FIG. 5*c* are essentially mirror images of each other, and they illustrate how the ends of the drawer constraint cable 203 is generally connected to a left and right side of the rack or base (not shown), where the connection is effected using swivel leveling mount fitting, hex locknuts, and wire rope grip fittings, where the drawer constraint cable and the weight constraint cable 205 is routed through a plurality of V-grooved rollers.
Figure 5C:
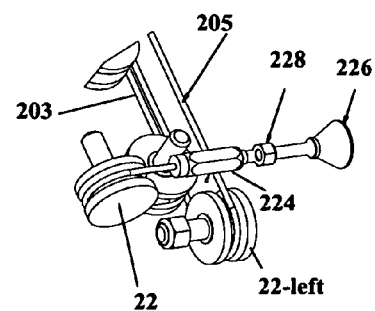

Referring to FIG. 5b and FIG. 5c, which are essentially mirror images of each other. The ends of the drawer constraint cable 203 is generally connected to a left side and a right side of the rack or base (not shown). In an exemplary embodiment, the connection is effected using swivel leveling mount fitting 226, hex locknuts 228, and wire rope grip fittings 224. The drawer constraint cable 203 and the weight constraint cable 205 is routed through a plurality of V-grooved rollers.

Figure 10:
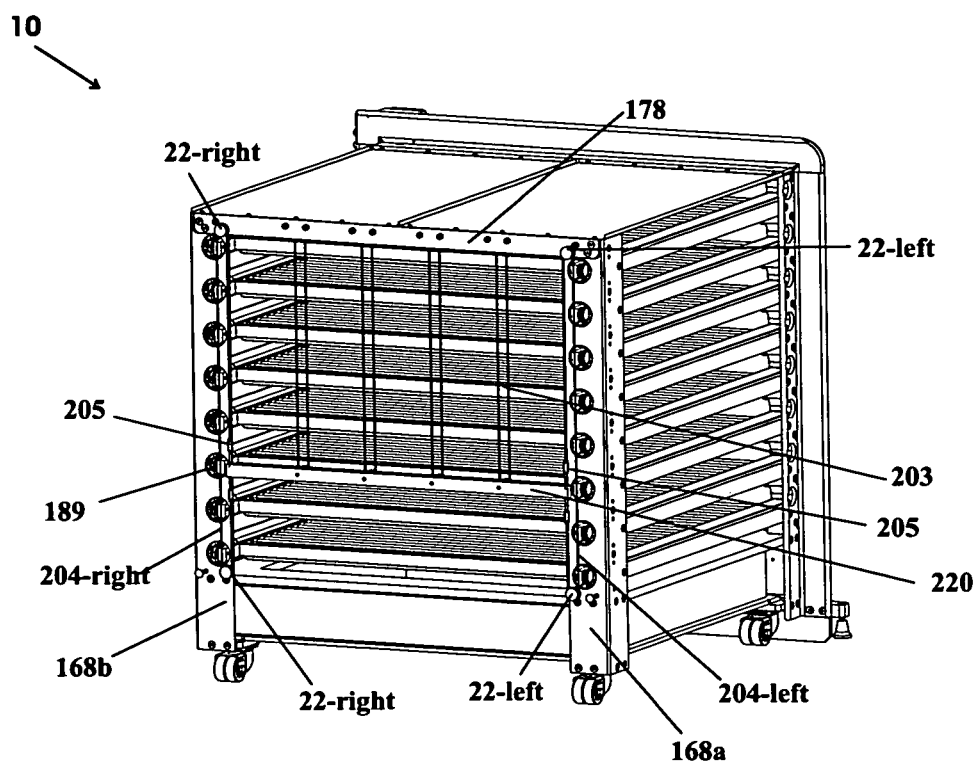
FIG. 10 is a perspective rear of the apparatus shown in FIG. 1, where the drawer constraint cable loops four times from the cross bar to the weight, and all of the drawers are closed so the start position for the weight is around the sixth drawer; and In FIG. 11 is a perspective frontal overhead view of the apparatus positioned inside and flush with an integral oven 50.

The apparatus 10 is shown from the rear in FIG. 10. The drawer constraint cable 203 loops, in an exemplary embodiment, four times from the cross bar 176 to the weight 220. All of the drawers are closed so the start position is around the sixth drawer. The sixth drawer portals are labeled 189-right, 189-left, accommodating extensions 130 and 132. When a drawer is opened, the counter weight 220 moves through a vertical path defined by the weight constraint cable 205. The upper most wire rope grip fittings 224 on the weight constraint cable 205 will eventually impact the V-grooved rollers 22 on the rack cross bar 178 as the counter weight 220 moves up. This point of impact is a stop position as there is no further vertical distance for the counter weight 220.

Also shown in FIG. 10 is a left v-grooved roller 22-left on the top rack cross bar 178, another left v-grooved roller 22-left near a bottom of the left rear angle 168a, a left wire rope grip fitting 224. (see FIG. 5a) The left wire rope grip fitting 224 locks a left end of the counter weight at a specific position on the cable and joins ends of the weight constraint cable so that the joined left weight constraint cable 204-left is a left taut closed loop. The left taut closed loop circles the left v-grooved roller on the top rack cross bar and the left v-grooved roller near the bottom of the left rear angle, where the left end of the counter weight is guided by the left taut closed loop. A right v-grooved roller 22-right on the top rack cross bar 187, a right v-grooved roller 22-right near a bottom of the right rear angle 168b, and a right wire rope grip fitting 224. (see FIG. 5a). The right wire rope grip fitting 224 locks a right end of the counter weight at a specific position on the cable and joins ends of the weight constraint cable so that the joined right weight constraint cable 204-right is a right taut closed loop. This right taut closed loop circles the right v-grooved roller on the top rack cross bar and the right v-grooved roller near the bottom of the right rear angle, where the right end of the counter weight is guided by the right taut closed loop.

The anti-tip safety mechanism 200 is a robust mechanical system, that can easily withstand, and anticipates, curing temperatures of about 150° F.-about 200° F. Furthermore, the anti-tip safety mechanism 200 works independent of the drawer of rollers, whether the rollers are turning or stationary. If there is failure in one of the drawers, the anti-tip safety mechanism 200 is unaffected. Based on this mechanism, it is relatively simple to take a drawer out-of-service, and install a replacement drawer. For instance, to replace drawer two, one would simply disengage the drawer's constraint cable 203 from the V-grooved rollers 22-d2 on extensions 130, 132. One would slide in the replacement drawer and reengage the drawer constraint cable 203 onto the replacement drawer's V-grooved rollers 22-d2 on extensions 130,132. The anti-tip safety mechanism 200 may be tested, by simply pulling out a drawer. If the mechanism is working properly, there will be some pulling tension on the drawer to draw the drawer back to the closed, stacked position. The tension does not increase as the drawer is pulled out further. However, the tension may dramatically increase when the counter weight reaches it stop position, which generally corresponds to more than one drawer being pulled out.

It is anticipated that the drawer configuration and the anti-tip safety mechanism 200 may be modified so that more than one drawer may be pulled out. For instance, the vertical rack 160 and anti-tip safety mechanism 200 may be configured to hold four drawers, and these racks may be stacked on each other, or stacked side-by-side.

Figure 11:
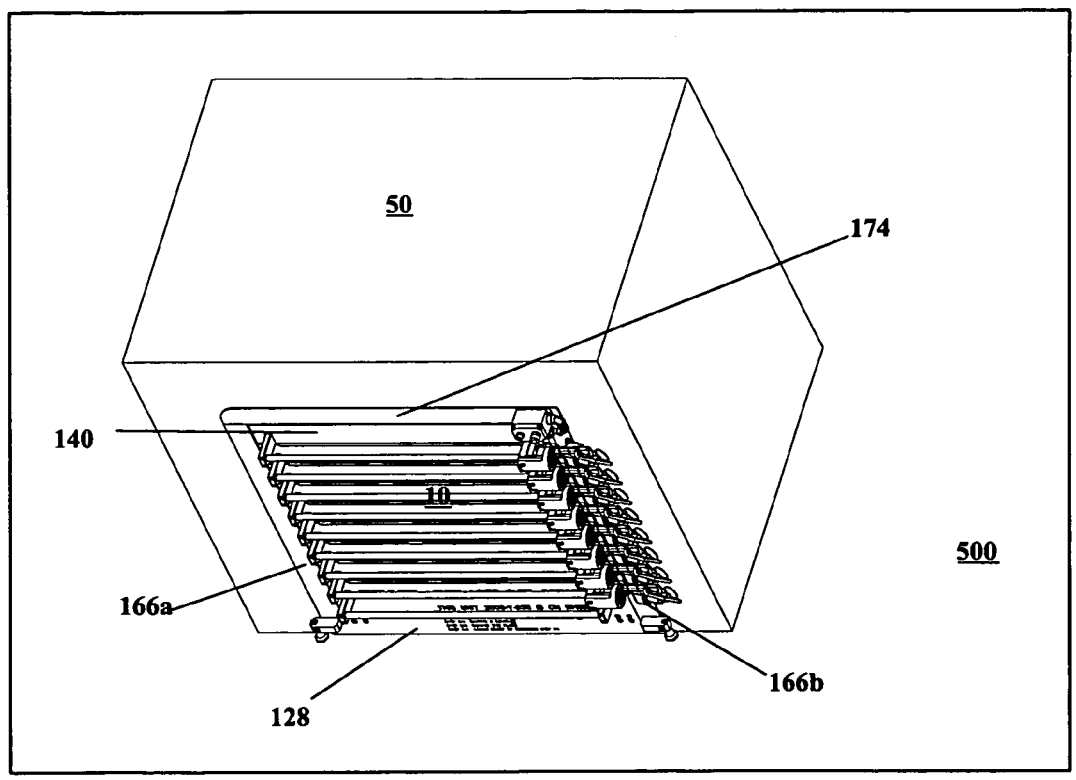

In FIG. 11, the apparatus 10 is positioned inside and flush with an integral oven 50. Cumulatively the face plates 140 function as a door to the oven 50. The front angle top 174, the left front angle 166a, the right front angle 166b and the front plate skirt 176 serve as flashing. When the whole apparatus is rolled into place in the oven, the swivel mount fittings 226-left, 226-right mounted on left rear angle 168a and right rear angle 168b (also shown in FIGS. 5b and 5c) hits a stop with hard point in the oven (not shown on any drawing).

The apparatus may be on a floor 500, where the floor 500 may be in a temperature and humidity controlled room. If the room may attain sufficiently high temperature, then the room may be used as the oven, enabling greater production, where no integral oven 50 will be required.

It is to be understood that the foregoing description and specific exemplary embodiments are merely illustrative of the best mode of the invention and the principles thereof, and that various modifications and additions may be made to the invention by those skilled in the art, without departing from the spirit and scope of this invention, which is therefore understood to be limited only by the scope of the appended claims.

Finally, any numerical parameters set forth in the specification and attached claims are approximations (for example, by using the term "about") that may vary depending upon the desired properties sought to be obtained by the embodiments of the present invention. At the very least, and not as an attempt to limit the application of the doctrine of equivalents to the scope of the claims, each numerical parameter should at least be construed in light of the number of significant digits and by applying ordinary rounding.

What is claimed is:

1. An apparatus for rotating and curing cylindrical shaped elements, comprising:
   a stackable drawer, comprising:
      a frame defining and supporting the drawer, said frame includes a lateral left angle element, a lateral right angle element, a face plate to which is externally attached a guard support holding a gear motor and an electrical connection, a left handle mount, right handle mount, a handle, a drawer cross bar that provides rear support,
      a left rearward extension of the left angle element, said left extension provides support for a lateral left wheel to facilitate easy of movement of the drawer through a track, and a left V-grooved roller/pulley proximate to an end of the left extension,
      a right rearward extension of the right angle element, said right extension provides support for a lateral right wheel to facilitate easy of movement of the drawer through a track, and a right V-grooved roller/pulley proximate to an end of the right extension, and
      a substantially planar assembly of driven cylindrical rollers sequentially driven by a driven sprocket on a gear motor connected to the assembly, where substantially each cylindrical roller includes a first sprocket on one end and a second sprocket on an opposing end, wherein the first sprocket on the first cylindrical roller is connected with a first chain to the driven sprocket on the gear motor, and the second sprocket on the first cylindrical roller is successively connected through a second chain to a second sprocket on a next roller, such that the next roller is driven by the first cylindrical roller, and subsequently therein making the next cylindrical roller a second driven cylindrical roller, which has a first sprocket that successively drives a following cylindrical roller, wherein the pattern repeats until all cylindrical rollers are driven and all rotate in the same direction;
   a catch tray for collecting and containing any material falling off or through the assembly of cylindrical rollers;
   a vertical rack comprising a framework of vertical and horizontal elements comprising: a left rear angle and a left rear support element, a right rear angle and a right rear support element, a left front angle and a left front support element, a right front angle and a right front support element, a rack cross bar, a top front angle, and lateral pairs of left and right C-channel forming tracks for each stackable drawer, and
   a cover on top of the vertical rack, wherein said vertical rack can hold one said drawer in each pair of tracks;

a base comprising a rectangular arrangement of beams, a front skirt plate, wherein said vertical rack is seated on the base;

a mechanism to facilitate movement comprising a set of casters including stops and non-abrasive treads;

a set of miniature screw jacks for affecting stabilization and leveling, said set of miniature screw jacks located on the front of the apparatus; and an anti-tip safety mechanism comprising a counter weight guided by a weight constraint cable assembly, and a drawer constraint cable assembly, where the drawer constraint cable is routed along the rear of the vertical frame guided by a plurality of v-grooved rollers around the left and right V-grooved roller/pulleys of each drawer, across the rack cross bar, and over and looped around v-grooved rollers on the counter weight, wherein when a drawer is pulled open the drawer constraint cable assembly raises the counter weight from a start position to a stop position, where the counter weight can no longer rise, and the opened drawer can not be opened any further, and no other drawers can be opened, and wherein when a drawer is closed the drawer constraint cable assembly lowers the counter weight from a stop position to a start position, where the counter weight can rise, and another drawer can be opened.

2. The apparatus according to claim 1, wherein said anti-tip safety mechanism maintains tension to close, whether said stackable drawer is in one of an open position and a closed position.

3. The apparatus according to claim 1, wherein said vertical rack is substantially open, allowing air to flow across the assembly of cylindrical rollers.

4. The apparatus according to claim 3, further comprising an integral oven,
wherein the said apparatus is rolled into the oven and stabilized using said miniature jacks.

5. The apparatus according to claim 3, further comprising an integral oven,
wherein the said apparatus is rolled into the oven and stabilized using said miniature jacks, and
wherein cumulatively said face plates of the stackable drawers and the front skirt plate serve as an oven door, and the left, right and top front angle elements of the vertical rack serve as flashing.

6. The apparatus according to claim 1, wherein said assembly of cylindrical rollers are elongate and covered with an anti-stick material, where said anti-stick material is selected from polytetrafluoroethylene.

7. The apparatus according to claim 1, wherein said apparatus includes eight stackable drawers, where each of said eight stackable drawers includes twenty six driven cylindrical rollers, and rotate one of thirteen cylindrical shaped elements and over one hundred cylindrical shaped elements.

8. The apparatus according to claim 7, wherein each stackable drawer is independently powered and independently controlled.

9. The apparatus according to claim 7, wherein each stackable drawer is independently powered and independently controlled, and
wherein said cylindrical shaped elements are rocket motor tubes, which include a liner cured prior to being cast with a propellant.

10. An apparatus for rotating and curing cylindrical shaped elements, comprising:

a stackable drawer comprising:
a frame defining and supporting the drawer, said frame includes a lateral left angle element, a lateral right angle element, a face plate to which is externally attached a guard support holding a gear motor, a left handle mount, right handle mount, a handle, a drawer cross bar that provides rear support,
a left rearward extension of the left angle element, said left extension provides support for a lateral left wheel to facilitate easy of movement of the drawer through a track, and a left V-grooved roller/pulley proximate to an end of the left extension,
a right rearward extension of the right angle element, said right extension provides support for a lateral right wheel to facilitate easy of movement of the drawer through a track, and a right V-grooved roller/pulley proximate to an end of the right extension,
a substantially planar assembly of driven cylindrical rollers sequentially driven by a driven sprocket on a gear motor connected to the assembly, where substantially each cylindrical roller has a first sprocket on one end and a second sprocket on an opposing end, wherein the first sprocket on the first cylindrical roller is connected with a first chain to the driven sprocket on the gear motor, and then the second sprocket on the first cylindrical roller is successively connected through a second chain to a second sprocket on a next roller, such that the next roller is driven by the first cylindrical roller, and subsequently therein making the next cylindrical roller a second driven cylindrical roller, which has a first sprocket that successively drives a following cylindrical roller, wherein the pattern repeats until all cylindrical rollers are driven and all rotate in the same direction,
an auxiliary lateral left wheel being located forward of said lateral left wheel,
an auxiliary lateral right wheel being located forward of said lateral right wheel, and
a catch tray for collecting and containing any material falling off or through the assembly of cylindrical rollers;

a vertical rack comprising a framework of vertical and horizontal elements comprising: a left rear angle and a left rear support element, a right rear angle and a right rear support element, a left front angle and a left front support element, a right front angle and a right front support element, a rack cross bar, a top front angle and lateral pairs of left and right C-channel forming tracks for each stackable drawer, and
a cover on top of the vertical rack, wherein said vertical rack can hold one said drawer in each pair of tracks;

a base comprising a rectangular configuration of beams, wherein said vertical rack is seated on the base;

a mechanism for moving the apparatus comprising a set of swivel casters having a hard rubber tread selected from one of Nylon, polyurethane and a tough elastomeric material that is non-abrasive, where each caster has a stop that sets the direction and freedom of the caster to move, where each caster is attached to a base-plate;

a set of miniature screw jacks being located on the front of the apparatus; and an anti-tip safety mechanism comprising a counter weight being guided by a weight constraint cable assembly, and
a drawer constraint cable assembly, where the drawer constraint cable is routed along the rear of the vertical frame guided by a plurality of v-grooved rollers around the left and right V-grooved roller/pulleys of each drawer, across the rack cross bar, and over and looped around v-grooved rollers on the counter weight, wherein when a drawer is pulled open the drawer constraint cable assembly raises the counter weight from a start position to a stop position, where the counter weight can no longer rise, and the opened drawer can not be opened any further, and no other drawers can be opened, and wherein when a drawer is closed the drawer constraint cable assembly lowers the counter weight from a stop position to a start position, where the counter weight can rise, and another drawer can be opened.

11. The apparatus according to claim 10, wherein said vertical rack is substantially open, allowing air to flow across the assembly of cylindrical rollers, and wherein front and rear vertical angle elements include portals to improve air circulation, and vertical support elements have track channels that are coextensive with the horizontal elements, specifically the left and right C-channel which forms the tracks for each stackable drawer.

12. The apparatus according to claim 11, wherein access to the rear elements of said vertical support elements is controlled by a pair of v-grooved rollers located at a rear opening to each track, where said pair of v-grooved rollers are proximate to a rear top and a rear bottom of both the left track and the right track, said v-grooved rollers functioning to guide the drawer constraint cable around the left and right V-grooved roller/pulleys of each drawer, and wherein said pairs of v-grooved rollers for each drawer ensure that each drawer is engaged with the drawer constraint cable.

13. The apparatus according to claim 11, further comprising an integral oven, wherein the said apparatus can be rolled into the oven and stabilized using said miniature jacks.

14. The apparatus according to claim 11, further comprising an integral oven, wherein the said apparatus can be rolled into the oven and stabilized using said miniature jacks, and wherein cumulatively said face plates of the stackable drawers and the front skirt plate serve as an oven door, and the left, right and top front angle elements of the vertical rack serve as flashing.

15. The apparatus according to claim 10, wherein said apparatus includes eight stackable drawers, where each of said eight stackable drawers includes twenty six driven cylindrical rollers, and rotate one of thirteen cylindrical shaped elements, and over one hundred cylindrical shaped elements.

16. The apparatus according to claim 10, wherein said weight constraint cable assembly comprises: a left v-grooved roller on the top rack cross bar, another left v-grooved roller near a bottom of the left rear angle, a left wire rope grip fitting which locks a left end of the counter weight at a specific position on the cable and joins ends of the weight constraint cable so that the joined left weight constraint cable is a left taut closed loop that circles the left v-grooved roller on the top rack cross bar and the left v-grooved roller near the bottom of the left rear angle, and wherein the left end of the counter weight is guided by the left taut closed loop; and a right v-grooved roller on the top rack cross bar, a right v-grooved roller near a bottom of the right rear angle, a right wire rope grip fitting which locks a right end of the counter weight at a specific position on the cable and joins ends of the weight constraint cable so that the joined right weight constraint cable is a right taut closed loop that circles the right v-grooved roller on the top rack cross bar and the right v-grooved roller near the bottom of the right rear angle, wherein the right end of the counter weight is guided by the right taut closed loop.

17. An apparatus for rotating cylindrical shaped elements, comprising:

a substantially planar assembly of driven cylindrical rollers sequentially driven by a driven sprocket on a gear motor connected to the assembly, where substantially each cylindrical roller includes a first sprocket on one end and a second sprocket on an opposing end, wherein the first sprocket on the first cylindrical roller is connected with a first chain to the driven sprocket on the gear motor, and then the second sprocket on the first cylindrical roller is successively connected through a second chain to a second sprocket on a next roller, such that the next roller is driven by the first cylindrical roller, and subsequently therein making the next cylindrical roller a second driven cylindrical roller, which has a first sprocket that successively drives a following cylindrical roller, wherein the pattern repeats until all cylindrical rollers are driven and all rotate in the same direction.

18. The apparatus according to claim 17, further comprising a frame holding said assembly, said frame includes a lateral left angle element, a lateral right angle element, a face plate, which is externally attached a guard support holding a gear motor, a left handle mount, right handle mount, a handle, and a drawer cross bar that provides rear support;

a left rearward extension of the left angle element, said left extension provides support for a lateral left wheel to facilitate easy of movement of the frame through a track, and a left V-grooved roller/pulley proximate to an end of the left extension; and a right rearward extension of the right angle element, said right extension provides support for a lateral right wheel to facilitate easy of movement of the frame through a track, and a right V-grooved roller/pulley proximate to an end of the right extension.

* * * * *